United States Patent [19]
Pasquale

[11] 3,720,270
[45] March 13, 1973

[54] GUIDING AND SUPPORTING MEANS FOR A BEATER

[76] Inventor: Michael J. Pasquale, 115 Grove St., Middletown, Conn. 06457

[22] Filed: Sept. 20, 1971

[21] Appl. No.: 181,951

[52] U.S. Cl. .....................173/163, 408/241, 416/63
[51] Int. Cl. ..............................................B01f 15/00
[58] Field of Search ..............143/43 A; 308/3 A, 4 R; 416/63; 51/170.1; 30/167, 276; 37/189; 173/162, 163; 64/4; 175/18, 70, 220; 172/41; 408/241

[56] References Cited

UNITED STATES PATENTS

| | | |
|---|---|---|
| 2,119,962 | 6/1938 | Raleigh ................................37/189 |
| 2,390,226 | 12/1945 | Smith ..................................51/170.1 |
| 2,697,457 | 12/1954 | Lawrence ..........................173/163 X |
| 2,779,259 | 1/1957 | Kelsey ...............................173/163 X |

*Primary Examiner*—Ernest R. Purser
*Attorney*—John M. Prutzman et al.

[57] ABSTRACT

A beater of the type having a motor and beater element with an elongated shank rotatably driven by the motor, is provided with auxiliary or additional guiding and supporting means including a handle grip for manual manipulation of the tool which is supported on a linkage pivotally attached at one end to the motor housing and mounting a bearing for the shank of the beater element which is movable axially of the shank.

8 Claims, 2 Drawing Figures

INVENTOR
MICHAEL J. PASQUALE
BY John M. Prutzman
ATTORNEY

GUIDING AND SUPPORTING MEANS FOR A BEATER

BACKGROUND AND SUMMARY OF THE INVENTION

The present invention relates to beaters of the portable type used for comminuting and mixing liquids, semiliquid and semi-solid substances, and is concerned, more particularly, with guiding and supporting means for such beaters which improves the functioning of the beaters and which facilitates the control and operation thereof. While the invention is applicable generally to beaters having a wide variety of uses, it is particularly advantageous for use with beaters designed for commercial or institutional culinary operations such as beating or mixing foodstuffs in relatively large volumes and in relatively large containers.

Beaters or mixers of the type to which the present invention pertains generally comprise a power source such as an electric motor having its output shaft coupled to the shank or shaft of a beater or mixing element. Normally such beaters or mixers are manipulated and guided in use by grasping or otherwise supporting the motor housing which may be provided with a hand grip integrally mounted or fixed thereto for this purpose. While such beaters or mixers serve a useful function, they are not entirely satisfactory particularly when the beater element is constructed with a long shank or provided with a long shaft for extension into a deep vessel or other container and when it is necessary or desirable for preferred mixing, beating or comminuting to raise and lower the beater element while it is being actuated throughout the vertical range of the container as, for example, when beating or mashing potatoes.

Accordingly, it is an object of the present invention to provide a handle connection for a beater or mixer which is particularly advantageous for use with such beaters or mixers which are intended for use with relatively deep containers or vessels and especially where it is desirable or advantageous in the use of the beater or mixer to dispose the mixer or beater element at varying heights throughout the vertical range of the vessel or container.

Another object of the invention is to provide such a handle connection which is of light weight and simple and economical to fabricate and assemble and which will provide a long service life without need for replacement or repair.

Other objects will be in part obvious and in part pointed out in more detail hereinafter.

These and related objects are accomplished in accordance with the present invention by providing a handle connection for beaters or mixers which is movable relative to the remainder of the assembly and which affords auxiliary bearing support for engagement with the shaft or shank of the beater element which is adjustable in relationship to the degree that the beater element is immersed into the vessel or container containing the material to be beaten, agitated or comminuted.

A better understanding of the invention will be obtained from the following detailed description and accompanying drawings illustrating a preferred embodiment in which the principle of the invention is employed.

DESCRIPTION OF THE PREFERRED EMBODIMENT

Figure 1:
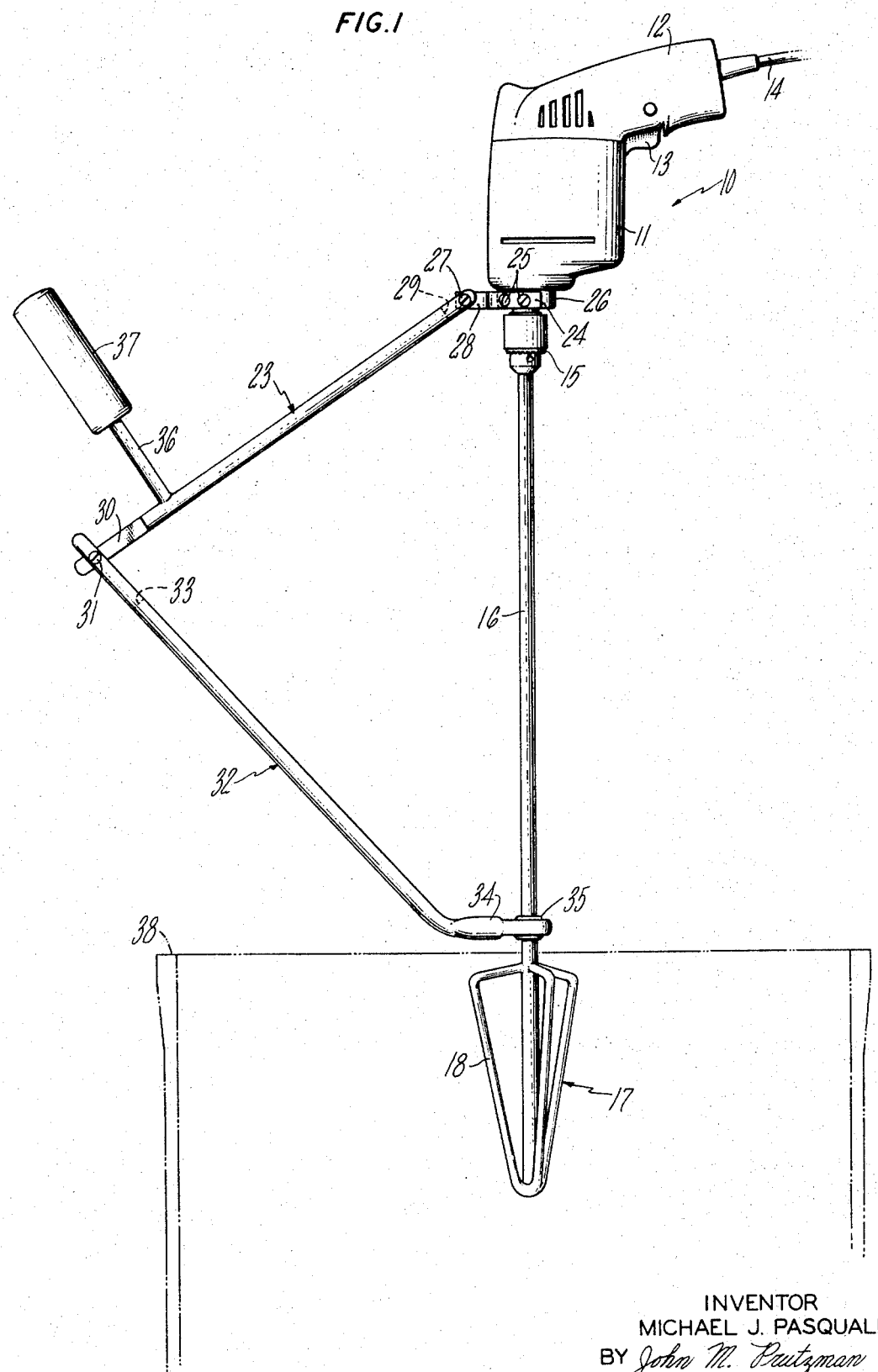
FIG. 1 is a side view of an embodiment of the auxiliary guiding and supporting means of the present invention shown attached to an exemplary beater with the beater element disposed adjacent the top of a container shown in dotted lines.

Referring now to the drawings in detail wherein like numerals designate like parts throughout both figures, a guiding and supporting means embodying the invention is shown in combination with an exemplary beater indicated generally at 10 comprising an electric motor housing 11 to the upper end of which is affixed a pistol grip 12 mounting the usual trigger type switch actuator 13 and power cord 14. The output shaft of the motor is connected to and drives a chuck 15 of conventional structure. In the embodiment shown in FIG. 1, there is secured in the chuck 15, an elongated shank 16 of a beater element 17 integrally formed on the lower end of the shank 16 and comprising a plurality of triangular members 18. In the embodiment shown in FIG. 2, a beater element 19 comprising a plurality of upturned prongs 20 is releasably attached at 21 to an elongated shaft 22 which is secured at its upper end in the chuck 15.

The guiding and supporting means embodying the invention comprises a first lever arm 23 having a pivotal connection at one end to a mounting bracket 24 which is secured by screws 25 to a boss 26 on the motor housing 11. The pivotal connection is formed by a pivot screw 27 extending transversely through the one end of the lever arm 23 and tang 28 on the bracket 24, the end of the lever arm 23 being bifurcated as indicated at 29 to receive the tang 28.

The opposite end of lever arm 23 is formed with a flattened portion 30 which is pivotally connected by the pivot screw 31 to the outer end of a second lever arm 32 which is bifurcated as indicated by dotted line 33 to receive the flattened end portion 30. The lower end of the second lever arm 32 has an angularly related terminal portion 34 in which is mounted a self-aligning bearing 35 of known construction. The bearing 35 will tilt relative to portion 34 of lever arm 32 in which it is mounted as best indicated by comparing its position in FIG. 1 where it embraces the lower end of the shank 16 of the beater element and is generally parallel to the portion 34 and its position in FIG. 2 where it embraces the upper end of the shaft 22 and is tilted relative to the portion 34 to remain in axial alignment with the shaft.

Handle means for the lever arms 23, 32 is provided in the specific embodiment by an upstanding post 36 affixed to the outer end of lever arm 23 and having a handle grip 37 secured to its free end. The handle grip 37 in combination with the pistol grip 12 or other means for grasping the housing 11 is used to select the desired angular position of the lever arms 23 and 32 and thus the location of the bearing 35, and also to guide the beater during a beating or mixing or comminuting operation. As will be apparent, the operator of the beater will grasp the pistol grip 12 in one hand and the handle grip 37 in the other hand, thus supporting and guiding the beater with the hands in spread apart positions.

The bearing 35 which supports the shaft or shank of the beater element for rotation therein preferably has a snug fit with the shaft or shank and yet with sufficient clearance to easily slide axially along the shaft or shank. The mechanical action of the lever arms 23 and 32 is such that when the pistol grip 12 or housing 11 is held rigid with one hand, the angular position of the lever arms 23 and 32 and thus the location of the bearing 35 along the shaft or shank can be readily adjusted by applying an upward or downward force on the handle grip 37 with the other hand. Once the adjusted position is selected, however, and thereafter the operator supports and guides the beater by moving the pistol grip 12 and handle grip 37 in unison, there is no apparent tendency for the lever arms 23 and 32 to shift angular position or to change the position of the bearing 35 on the shaft or shank of the beater element.

Figure 2:
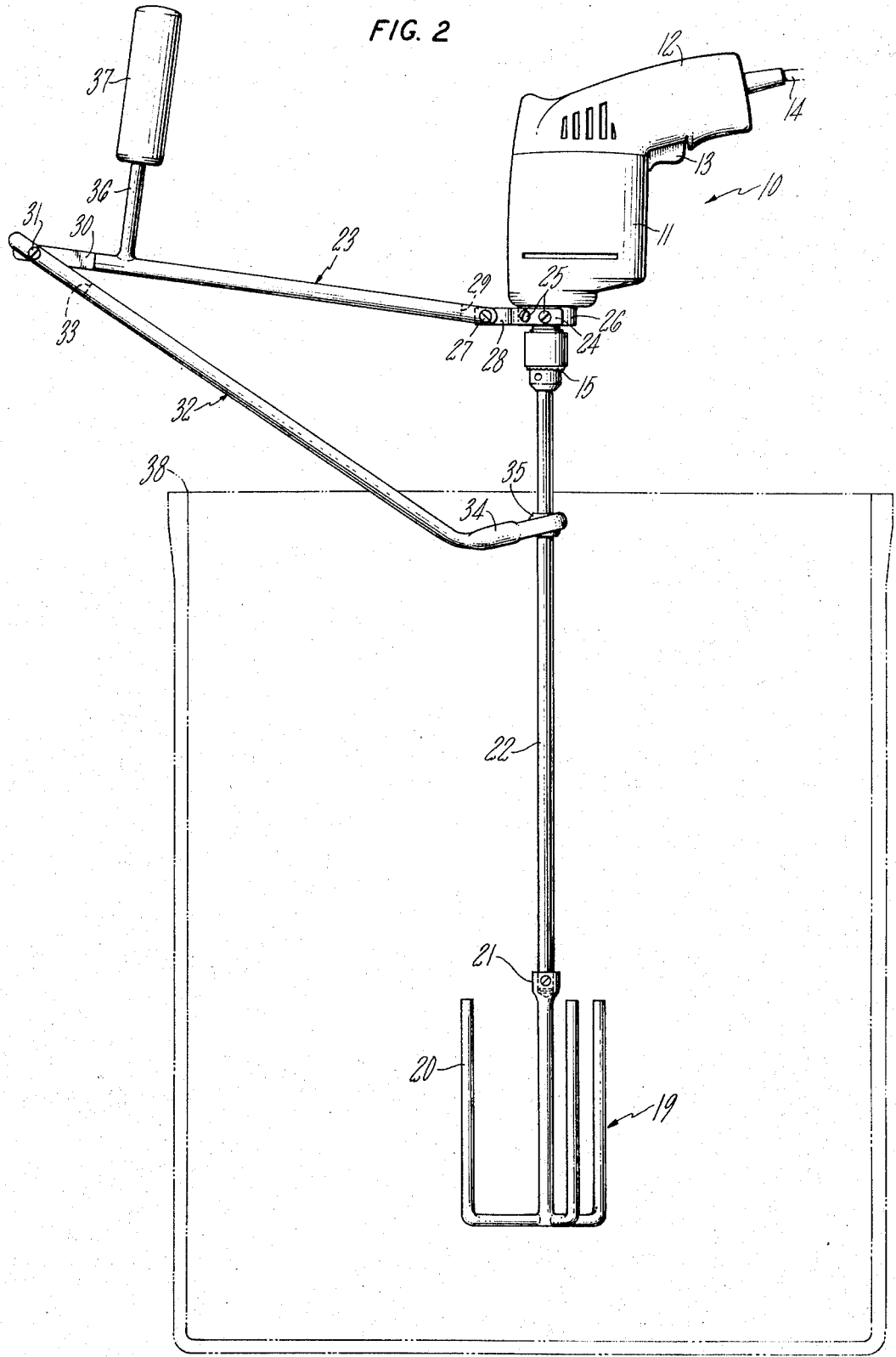
FIG. 2 is a side view similar to FIG. 1 showing the exemplary beater with a different beater element and with the beater element lowered to a fully immersed position in the container.

An advantage of the invention will be apparent from a comparison of FIGS. 1 and 2 showing two extreme positions of the guiding and supporting assembly. In FIG. 1, the beater element 17 is located adjacent the top of a container 38 shown in phantom and containing the material (not shown) to be beaten or mixed or comminuted. Such a starting position is desirable, for example, when beating or mashing potatoes. In this position, the bearing 35 supports the shaft 16 closely adjacent the beater element 17 and the handle grip 37 is brought to a lower position also more closely adjacent the beater element 17 to render the holding and guiding of the beater in this position more effective. In FIG. 2, by contrast, where the beater element 19 is positioned in the lowermost part of the container 38, the lever arm 32 has been brought to a position where it will clear the upper edge of the container 38 and the pistol grip 12 and hand grip 37 are spread apart to the fullest degree for stability of operation.

Another advantage of the invention is that because of the linkage provided by lever arms 23 and 32, the lever arms may be made relatively small cross-sectional dimensions and light weight as compared, for example, with an outwardly extending arm rigidly connected to the housing. This is important from the standpoint of convenience in handling where a portable beater is concerned and also from a cost standpoint particularly where the material used in fabricating the assembly is stainless steel which is preferred in devices which are intended for culinary use.

For convenience of storage, the shank 16 of the beater element 17 shown in FIG. 1 may be detached from the chuck 15 and then disengaged from the bearing 35 but pulling it axially therethrough, whereupon the lever arms 23 and 32 may be folded together into a compact position. The same result can be attained by detaching the beater element 19 shown in FIG. 2 from the shaft 22 whereupon the bearing 35 can be slid off the free end of the shaft 22.

While the present invention is particularly advantageous for use with beaters intended for culinary use, the term "beater" is used herein generically to include beaters, mixers, and agitating and comminuting devices of the type disclosed and without limitation as to the specific use for which the device is intended.

As will be apparent to persons skilled in the art, various modifications, adaptations and variations of the foregoing specific disclosure can be made without departing from the teachings of the present invention.

I claim:

1. In a beater comprising a portable housing, a beating element provided with an elongated shaft, driving means supported in the housing for rotating the elongated shaft, and means for connecting the driving means to the elongated shaft, wherein the improvement comprises auxiliary holding and guiding means comprising first and second lever arms pivotally connected together adjacent their one ends, the other end of the first lever arm being pivotally connected to the portable housing, a bearing mounted on the other end of the second lever arm engaging the elongated shaft and being slidable axially of the shaft, and handle means secured to one of the lever arms.

2. In a beater as defined in claim 1, wherein the bearing is a self-aligning bearing which is tiltable relative to the second lever arm to accommodate varying angular relationships between the second lever arm and the shaft.

3. In a beater as defined in claim 1 and wherein the handle means comprises a hand grip attached to the first lever arm and movable therewith.

4. In a beater as defined in claim 1 and wherein the driving means is an electric motor, and a handle is secured to the exterior of the portable housing.

5. In a beater as defined in claim 3 and wherein the first lever arm is pivotally connected to the portable housing adjacent the means for connecting the driving means to the elongated shaft, and the hand grip is attached to the first lever arm adjacent the end pivotally connected to the second lever arm.

6. In a beater as defined in claim 1 wherein the beating element is detachably connected to the elongated shaft and may be removed to permit the bearing to be disengaged from the elongated shaft in a direction axially outwardly from the shaft to facilitate storage of the beater.

7. In a beater as defined in claim 2 wherein the lever arms are dimensioned to permit the bearing to be moved axially of the shaft throughout substantially the entire length of the shaft.

8. Auxiliary guiding and supporting means for use with a beater of the type having a housing mounting, a motor, and an elongated shaft driven by the motor, comprising first and second lever arms pivotally connected together adjacent their one ends, a bracket pivotally connected to the other end of the first lever arm for attachment to the housing, a bearing mounted on the other end of the second lever arm for slidably receiving the shaft, and handle means secured to one of the lever arms.

* * * * *